US008838516B2

(12) United States Patent
Kunjithapatham et al.

(10) Patent No.: US 8,838,516 B2
(45) Date of Patent: Sep. 16, 2014

(54) NEAR REAL-TIME ANALYSIS OF DYNAMIC SOCIAL AND SENSOR DATA TO INTERPRET USER SITUATION

(75) Inventors: Anugeetha Kunjithapatham, Mountain View, CA (US); Priyang Rathod, Mountain View, CA (US); Thomas Phan, San Jose, CA (US); Simon Gibbs, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 13/413,546

(22) Filed: Mar. 6, 2012

(65) Prior Publication Data
US 2013/0238544 A1 Sep. 12, 2013

(51) Int. Cl.
*G06F 17/00* (2006.01)
*G06N 3/00* (2006.01)

(52) U.S. Cl.
CPC .................................. *G06N 3/00* (2013.01)
USPC ........................................................ 706/45

(58) Field of Classification Search
CPC ............................................... G06N 3/00
See application file for complete search history.

(56) References Cited

U.S. PATENT DOCUMENTS

| 7,933,226 | B2 | 4/2011 | Woodruff et al. | |
| 8,121,618 | B2 * | 2/2012 | Rhoads et al. | 455/456.1 |
| 8,364,540 | B2 * | 1/2013 | Soroca et al. | 705/14.64 |
| 2012/0102050 | A1 * | 4/2012 | Button et al. | 707/749 |
| 2013/0159233 | A1 * | 6/2013 | Mason et al. | 706/45 |
| 2013/0183926 | A1 * | 7/2013 | Lindberg et al. | 455/405 |
| 2013/0226850 | A1 * | 8/2013 | Hannuksela et al. | 706/14 |

OTHER PUBLICATIONS

Lei et al., "Applying Situation Awareness to Mobile Proactive Information Delivery," Lecture Notes in Computer Science, 2007, vol. 4809/2007, pp. 592-603.

* cited by examiner

*Primary Examiner* — Alan Chen
(74) *Attorney, Agent, or Firm* — Kenneth L. Sherman, Esq.; Michael Zarrabian, Esq.; Sherman & Zarrabian LLP

(57) ABSTRACT

In a first embodiment of the present invention, a method of interpreting a situation of a user of an electronic device is provided, comprising: gathering social data related to the user; monitoring one or more physical sensors on the electronic device in order to gather physical data related to the user; mapping structured data in the social data and the physical data to internal data types; extracting features from unstructured social data; identifying attributes related to the features; obtaining values for the identified attributes; interpreting movement of the user by examining the physical data; and detecting a situation of the user by fusing the movement of the user with the identified attributes of the features of the unstructured social data and features of structured social data.

24 Claims, 3 Drawing Sheets

US 8,838,516 B2

NEAR REAL-TIME ANALYSIS OF DYNAMIC SOCIAL AND SENSOR DATA TO INTERPRET USER SITUATION

BACKGROUND OF THE INVENTION

1. Field of the Invention

The present invention relates generally to electronic content. More particularly, the present invention relates to the near real-time analysis of dynamic social and sensor data to interpret user situation to better recommend electronic content.

2. Description of the Related Art

The amount of electronic content, especially online content, has undergone an explosion in recent years, mostly due to the rise in prevalence of the Internet. This explosion further exacerbates the frustrations of already overwhelmed consumers, since the majority of the content and information is irrelevant to a particular user at a particular moment. More than ever before, consumers are longing for a solution that would put the information they need or things they like at their fingertips when they need them. On the other hand, businesses have accumulated an astronomical amount of data detailing consumers' online activities. It is commonly recognized that mining the data to understand consumers' interests and sentiments can enable better targeted marketing and advertisement.

The main weakness of prior art mining techniques is their blindness about the user's situation. At a particular moment, what a user needs or likes and what is appropriate to suggest to the user can be highly variable based upon the user's situation. For example, even though a user may like good wine, suggesting going to a wine tasting nearby may not be a good idea when his friends with him at the time do not like wine. In another example, a user may enjoy going to theaters, visiting museums, and hiking, but which of these activities to suggest may depend greatly on the weather, the users mood, and on whether of her friends who share a same interest are available.

While improving recommendation is important on any computing platform, it is especially important for devices with small form factors such as mobile phones, due to small display areas, lower processing speed, and more limited user input.

Longer term interests of a user can be inferred based on a user's historical interests, physical behavior, virtual behavior (such as online shopping patterns, etc.) However, determining a user's current "situation" (in terms of his or her current activity, location, emotion, etc.) to infer his or her potential shorter term needs would be quite valuable.

SUMMARY OF THE INVENTION

In a first embodiment of the present invention, a method of interpreting a situation of a user of an electronic device is provided, comprising: gathering social data related to the user; monitoring one or more physical sensors on the electronic device in order to gather physical data related to the user; mapping structured data in the social data and the physical data to internal data types; extracting features from unstructured social data; identifying attributes related to the features; obtaining values for the identified attributes; interpreting movement of the user by examining the physical data; and detecting a situation of the user by fusing the movement of the user with the identified attributes of the features of the unstructured social data and features of structured social data.

In a second embodiment of the present invention, an electronic device is provided comprising: one or more physical sensors; one or more physical sensor monitors configured to monitor the one or more physical sensors and output data mapped to internal data types; one or more social data monitors configured to monitor social interaction from the electronic device and output at least unstructured social data; a feature extractor coupled to the one or more social data monitors and configured to extract features from the unstructured social data; a semantic analyzer coupled to the feature extractor and configured to identify attributes related to the features and obtain values for the identified attributes; a sensor fusion and abstraction module coupled to the one or more physical sensor modules and configured to interpret movement of a user of the electronic device by examining the physical data; a situation detector coupled to the semantic analyzer and sensor fusion and abstraction module and configured to detect a situation of the user by fusing the movement of the user with the identified attributes of the features of the unstructured social data and features of structured social data.

In a third embodiment of the present invention, an apparatus for interpreting a situation of a user of an electronic device is provided, comprising: means for gathering social data related to the user; means for monitoring one or more physical sensors on the electronic device in order to gather physical data related to the user; means for mapping structured data in the social data and the physical data to internal data types; means for extracting features from unstructured social data; means for identifying attributes related to the features; means for obtaining values for the identified attributes; means for interpreting movement of the user by examining the physical data; and means for detecting a situation of the user by fusing the movement of the user with the identified attributes of the features of the unstructured social data and features of structured social data.

In a fourth embodiment of the present invention, a non-transitory program storage device readable by a machine tangibly embodying a program of instructions executable by the machine to perform a method of interpreting a situation of a user of an electronic device is provided, comprising: gathering social data related to the user; monitoring one or more physical sensors on the electronic device in order to gather physical data related to the user; mapping structured data in the social data and the physical data to internal data types; extracting features from unstructured social data; identifying attributes related to the features; obtaining values for the identified attributes; interpreting movement of the user by examining the physical data; and detecting a situation of the user by fusing the movement of the user with the identified attributes of the features of the unstructured social data and features of structured social data.

DETAILED DESCRIPTION OF SPECIFIC EMBODIMENTS

Figure 1:
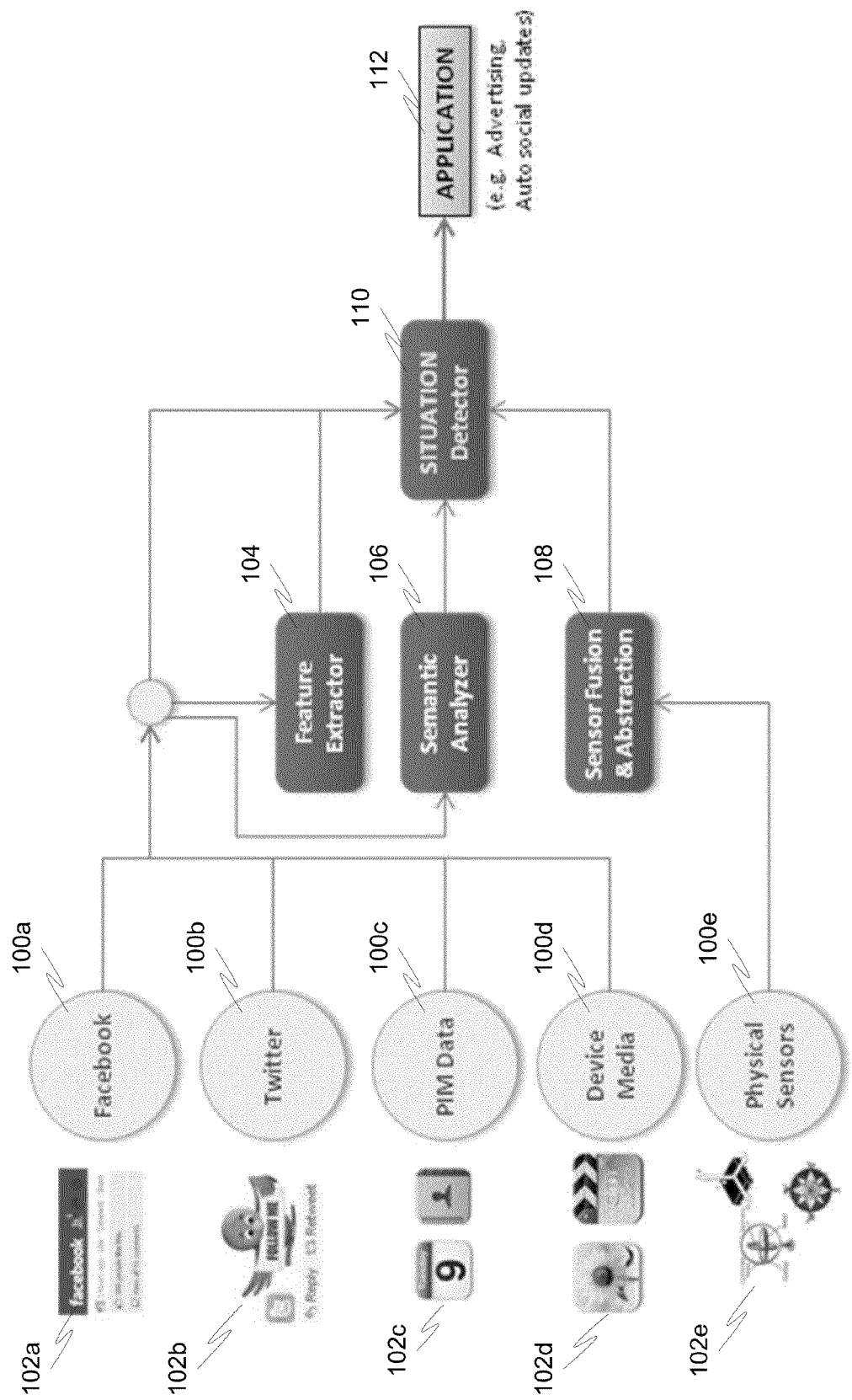
FIG. 1 is an architecture diagram in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

The present invention provides a solution where a user's situation is interpreted in near real-time in order to better analyze his or her short term needs. The user situation can be output in terms of various attributes, such as current activity, location, emotional state, time of day, etc. This interpretation and resulting output can be achieved by fusion, abstractions, and analysis of data from multiple sources.

A situation may be defined as the values of a set of variables that affect and sometimes determine a user's preference, behaviors, and decision making. Generally speaking, a situation can be defined by one or more of the following categories of variables: (1) variables that define a physical environment (e.g., location, time, weather, sound, lighting, etc.); (2) variables that define a social circumstance (e.g., people around the user, category of venue the user is in, etc.); (3) variables that define a user state (e.g., mood, emotion, heart rate, blood pressure, glucose level, etc.); and (4) variables that define user activity (e.g., physical activities such as walking, driving, sleeping, dancing, etc., and online activities such as email, phone calls, shopping, social networking, web surfing, viewing and interacting with content, etc.).

Not all variables need to be used in defining a situation. Roughly speaking, which variables are important in defining situations will vary from one application domain to another application domain. For example, selecting a piece of music to listen to could mainly depend on the user's mood, activity, and people around, while other variables are less important or not important at all. What variables are important can also vary from one user to another. For example, for one user weather may be an important factor in deciding what activity to perform, but not for other users.

The sources from which data can be obtained in order to perform this analysis can vary. In one embodiment of the present invention, physical sensors on the user's device, such as a GPS module, accelerometer, microphone, camera, etc. can be used. Data from such sensors may include raw data/readings or abstracted data. This data can provide useful hints about a user's physical context, such as the user's physical movement pattern or activity, and physical locations. Raw sensor readings can be interpreted into a higher-level abstraction such as running, walking, moving, shaking, etc.

In another embodiment, data from social applications can be used to provide useful hints about a user's social context. This may include examining a user's social circles, including friends, colleagues, and others who may influence the user the most. This may also include examining social experiences, such as endorsements, reviews, dislikes, etc. This may also include examining a user's social interests, such as groups, products, activities, etc. This may also include examining a user's lifestyle, such as whether they are active, eco-friendly etc., based on a user's experiences/interests/activities.

Indeed, any social applications configured by the user, including social networking sites and personal information management applications (such as contacts, calendar, email, texting, etc.) can be used as a source of data. The data from such applications can include, but is not limited to, content, posts, updates, notifications, etc. Some of this data is relatively static, such as contacts and calendar entries. Other of this data is dynamic, such as posts, updates, notifications, text messages, etc.

The present invention focuses on interpreting the user's situation through fusion and abstraction of dynamic data including various sensor data plus social data, as well as some static data. The user's situation can then be expressed using a variety of attributes such as user activity, location, emotional state, the current time, the occasion/event the user is participating in, people around the user, etc.

FIG. 1 is an architecture diagram in accordance with an embodiment of the present invention. A number of monitors 100a, 100b, 100c, 100d, 100e may be used to monitor corresponding sources of data 102a, 102b, 102c, 102d, 102e. The monitors continually listen to or ping for new data and/or notifications from the respective sources. When updates are received, any structured data can be mapped into an internally defined data type. Table 1 below defines some sample data types in accordance with an embodiment of the present invention. Any semi-structured or unstructured data can simply be labeled as text.

TABLE 1

| DATA TYPES | EXAMPLE VALUES |
|---|---|
| EVENT name & Type | name: "Bay to Breakers" type: Marathon, Party, Concert |
| PERSON name & Type of Relationship or Circle | name: "Mary Ann" relationship: Family, Family, Friends, Work Friends, Hiking Club |
| PLACE, Type & Address | name: "Nepenthe" type: Restaurant, Shop, Mall address: Big Sur, CA |
| ACTIVITY | walking, running, dancing |
| EMOTION | stressed, excited |
| TEXT | "Loved biking in San Francisco!" |

A feature extractor 104 receives new data from the non-hardware sensor monitors, such as text data from text messages and social networking interactions. It then extracts named entities and significant topics from the text. Natural language programming techniques such as named entity extraction can be applied to extract names of people, places, etc. Frequency-based metrics such as term frequency-inverse document frequency (TF-IDF) can be applied to measure the importance of words and phrases and extract significant topics. TF-IDF is statistic that reflects how important a word is to a document in a collection or corpus. Furthermore, an aging scheme could be applied to assign variable weights to keywords and features depending on the time of their occurrence.

A semantic analyzer 106 can then receive named entities from the feature extractor 104 and structured data from monitors 100a-100e. Such data may include named entities and significant topics from the feature extractor 104 and names of events, places, people, activity, etc. from other sources. When it receives new data, it can identify additional attributes related to the received data using a schema or ontology. It then can further retrieve values for each related attribute (if the value is not already available), through one or more sources such as a search engine or online database of entities. For example, if the semantic analyzer 106 is given [EVENT name: 'U2 Concert'] it can identify 'name', 'attendees', 'venue', 'date', 'type of event', etc. as attributes of an 'EVENT' and retrieve values for each of those attributes (e.g., venue: 'Oakland Arena', type: 'music concert').

A sensor fusion and abstraction module 108 receives raw sensor readings from monitors of physical sensors, such as accelerometers, GPS modules, microphones, etc. and interprets the sensor readings into movements of the user, such as walking, rhythmic movement, etc. This may include applying classification techniques such as Naïve Bayesian Classification, Support Vector Machines, Hidden Marcov Model, decision trees, etc.

A situation analyzer 110 then receives data from the feature extractor 104, semantic analyzer 106, sensor fusion and abstraction module 108, and monitors 100a-100e. Such data can include named entities along with relevant attributes and structured data. When it receives new data, it can analyze the combined data together and attempt to create a complete picture of the user's situation in terms of one or more of the following attributes: event in which the user is currently participating, people around the user, location of the user, activity of the user, and emotion of the user. All of these attributes are real-time or at least near-real time, attempting to gain a picture of the user's situation right now.

This may be achieved by applying custom rule-based classification techniques. Rules that specify which data source and what kind of data sequence and attributes should be given higher weights for each type of data that needs to be derived can be created. Using such rules based on the source, sequence, and relative weights of incoming data, a final weight for a particular data received from multiple sources is calculated and values with a weight greater than a set threshold (possibly configurable by the developer) is considered to be an attribute of the user's situation. For example, for an 'EVENT' data type, a rule such as the following may be specified: 'EVENT' information from calendar entries and named entities should be assigned higher weight. It should be noted that in some embodiments, rather than using custom rule-based classification techniques, classification algorithms such as Naïve Bayesian, Support Vector Machines, Hidden Markov models, etc. can be used to analyze and classify sensor and social data from varied sources. The first step in that case would be collect or record data using a text system and trial user and make available such data for training the classification algorithms.

The output of the situation analyzer 106 can be further used for a wide variety of applications 112, including advertising, automatic social updates, recommendation, etc.

It should be noted that the intervals at which the various processing components 104-110 of the system can process the newly received data is configurable. For example, the situation analyzer 110 may run every 30 minutes to estimate the user's current situation every 30 minutes.

Figure 2:
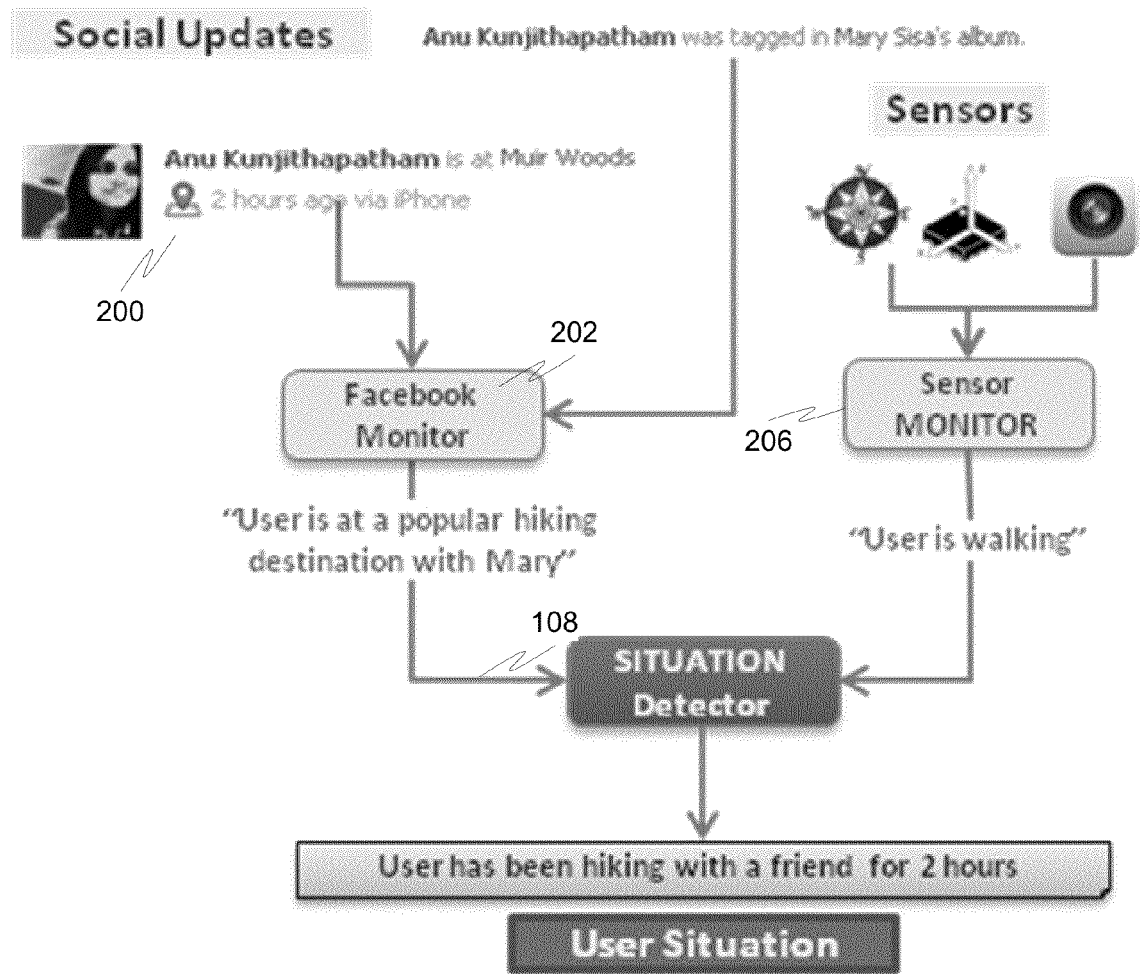
FIG. 2 is a diagram illustrating an example scenario in accordance with an embodiment of the present invention.

FIG. 2 is a diagram illustrating an example scenario in accordance with an embodiment of the present invention. User 200 may update a Facebook™ page with information that the user is hiking with a friend. A Facebook™ monitor 202 may detect this change, and pass this information to situation detector 204. At the same time, a physical sensor monitor 206 may detect a change in a physical sensor that implies the user is walking (such as accelerometer and GPS modules indicating movement at 3 miles per hour). The situation detector 204 is then able to deduce that the user has been hiking with this friend for X number of minutes (since the detected movement began).

Figure 3:
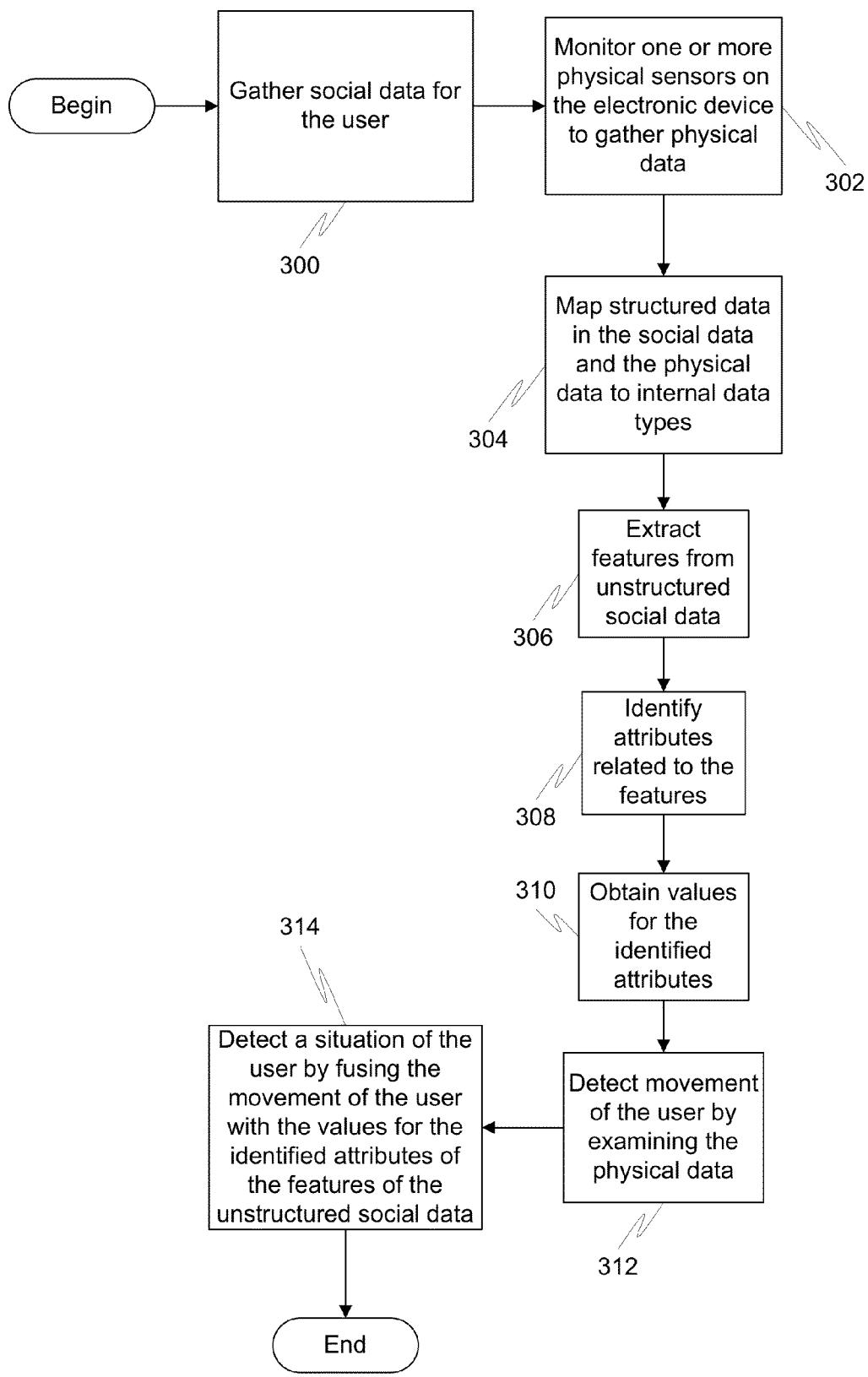
FIG. 3 is a flow diagram illustrating a method of interpreting a situation of a user of an electronic device in accordance with an embodiment of the present invention.

FIG. 3 is a flow diagram illustrating a method of interpreting a situation of a user of an electronic device in accordance with an embodiment of the present invention. At 300, social data related to the user is gathered. This may be performed by, for example, monitoring communications between the electronic device and a social networking site. It should be noted that these communications may either be monitored directly or indirectly. Direct monitoring may involve intercepting a generated communication prior to it being transmitted over the networking to a social networking site, or even by intercepting the communication at a third party device prior to it being received by the social networking site. Another example of direct monitoring includes using an application programming interface (API) provided by a web site to retrieve, or monitor for, social data. Indirect monitoring may involve receiving a notification from a social networking application that the user has input a notification or update, such as through the use of hooks inserted into the social networking application for just such a purpose. Thus, the system subscribes to and listens to notifications from the social networking service. Alternatively, indirect communication may involve periodically monitoring or pinging a social networking site to see what updates the user has provided. The monitoring may be performed on a periodic basis.

At 302, one or more physical sensors on the electronic device are monitored in order to gather physical data related to the user. The monitoring may be performed on a periodic basis. At 304, structured data in the social data and the physical data is mapped to internal data types. At 306, features are extracted from unstructured social data. At 308, attributes related to the features are identified. At 310, values are obtained for the identified attributes. At 312, movement of the user is detected by examining the physical data. At 314, a situation of the user is detected by fusing the movement of the user with the values for the identified attributes of the features of the unstructured social data. This detection can include applying custom rule-based filtering a prioritization techniques to the movement of the user and the values for the identified attributes of the features of the unstructured social data. The custom rule-based filtering can include specifying rules indicating which data sources, sequences, types, and attributes should be assigned a higher weight.

At the end of the process, a user situation has been identified. Due to the near-real time analysis of this situation, the situation can then be utilized to make recommendations or perform other actions that can help in addressing a user's short-term need (i.e., what the user needs "right now").

In summary, the present invention allows for making use of dynamic social data and updates in order to derive a user's current situation. This is a simple and practical methodology that enables near real-time processing and analysis. Processing is able to be performed on a mobile device, without the need for a cloud or remote server. It is a unique way to represent a user's situation at a particular moment, in terms of current location, activity, event, surrounding people, and emotions.

As will be appreciated to one of ordinary skill in the art, the aforementioned example architectures can be implemented in many ways, such as program instructions for execution by a processor, as software modules, microcode, as computer program product on computer readable media, as logic circuits, as application specific integrated circuits, as firmware, as consumer electronic device, etc. and may utilize wireless devices, wireless transmitters/receivers, and other portions of wireless networks. Furthermore, embodiment of the disclosed method and system for displaying multimedia content on multiple electronic display screens can take the form of an entirely hardware embodiment, an entirely software embodiment, or an embodiment containing both software and hardware elements.

The term "computer readable medium" is used generally to refer to media such as main memory, secondary memory, removable storage, hard disks, flash memory, disk drive memory, CD-ROM and other forms of persistent memory. It should be noted that program storage devices, as may be used to describe storage devices containing executable computer code for operating various methods of the present invention, shall not be construed to cover transitory subject matter, such as carrier waves or signals. Program storage devices and computer readable medium are terms used generally to refer to media such as main memory, secondary memory, removable storage disks, hard disk drives, and other tangible storage devices or components.

Although only a few embodiments of the invention have been described in detail, it should be appreciated that the invention may be implemented in many other forms without departing from the spirit or scope of the invention. Therefore, the present embodiments should be considered illustrative and not restrictive and the invention is not to be limited to the details given herein, but may be modified within the scope and equivalents of the appended claims.

What is claimed is:

1. A method of interpreting a situation of a user of an electronic device, comprising:
    gathering social data related to the user;
    monitoring one or more physical sensors on the electronic device in order to gather physical data related to the user;
    mapping structured data in the social data and the physical data to internal data types;
    extracting features from unstructured social data;
    identifying attributes related to the features;
    obtaining values for the identified attributes;
    interpreting movement of the user by examining the physical data; and
    detecting a situation of the user by fusing the movement of the user with the identified attributes of the features of the unstructured social data and features of structured social data, wherein the features of the unstructured social data and the features of the structured social data comprise at least one of: one or more named entities and one or more topics.

2. The method of claim 1, wherein the detecting includes applying custom rule-based filtering and prioritization techniques to the movement of the user and the values for the identified attributes of the features of the unstructured social data.

3. The method of claim 2, wherein the custom rule-based filtering includes specifying rules indicating which data sources, sequences, types, and attributes should be assigned a higher weight.

4. The method of claim 1, wherein the monitoring of communications is performed on a periodic basis.

5. The method of claim 1, wherein the monitoring of communications is performed by examining data stored by a social networking application on the electronic device.

6. The method of claim 1, wherein the electronic device is a mobile device.

7. The method of claim 6, wherein the method is performed by the mobile device.

8. An electronic device comprising:
    one or more physical sensors;
    one or more physical sensor monitors configured to monitor the one or more physical sensors and output data mapped to internal data types;
    one or more social data monitors configured to monitor social interaction from the electronic device and output at least unstructured social data;
    a feature extractor coupled to the one or more social data monitors and configured for extract features from the unstructured social data;
    a semantic analyzer coupled to the feature extractor and configured to identify attributes related to the features and obtain values for the identified attributes;
    a sensor fusion and abstraction module coupled to the one or more physical sensor modules and configured to interpret movement of a user of the electronic device by examining the physical data;
    a situation detector coupled to the semantic analyzer and sensor fusion and abstraction module and configured to detect a situation of the user by fusing the movement of the user with the identified attributes of the features of the unstructured social data and features of structured social data, wherein the features of the unstructured social data and the features of the structured social data comprise at least one of: one or more named entities and one or more topics.

9. The electronic device of claim 8, wherein the one or more physical sensors include a global positioning system (GPS) module.

10. The electronic device of claim 8, wherein the one or more physical sensors include an accelerometer.

11. The electronic device of claim 8, wherein the one or more physical sensors include a microphone.

12. The electronic device of claim 8, wherein the one or more social network modules are configured to monitor one or more social networking applications installed on the electronic device.

13. The electronic device of claim 8, wherein the feature extractor is configured to utilize a natural language programming technique.

14. The electronic device of claim 13, wherein the natural language programming technique include named entity extraction.

15. The electronic device of claim 13, wherein the feature extractor is configured to compute term frequency-inverse document frequency.

16. The electronic device of claim 8, wherein the sensor fusion and abstraction module is configured to apply Naive Bayesian Classification.

17. The electronic device of claim 8, wherein the sensor fusion and abstraction module is configured to use decision trees.

18. The electronic device of claim 8, wherein the sensor fusion and abstraction module is configured to apply Support Vector Machines.

19. The electronic device of claim 8, wherein the sensor fusion and abstraction module is configured to apply Hidden Marcov Model.

20. An apparatus for interpreting a situation of a user of an electronic device comprising:
    means for gathering social data related to the user;

means for monitoring one or more physical sensors on the electronic device in order to gather physical data related to the user;

means for mapping structured data in the social data and the physical data to internal data types;

means for extracting features from unstructured social data;

means for identifying attributes related to the features;

means for obtaining values for the identified attributes;

means for interpreting movement of the user by examining the physical data; and means for detecting a situation of the user by fusing the movement of the user with the identified attributes of the features of the unstructured social data and features of structured social data, wherein the features of the unstructured social data and the features of the structured social data comprise at least one of: one or more named entities and one or more topics.

21. A non-transitory program storage device readable by a machine tangibly embodying a program of instructions executable by the machine to perform a method of interpreting a situation of a user of an electronic device, comprising:

gathering social data related to the user;

monitoring one or more physical sensors on the electronic device in order to gather physical data related to the user;

mapping structured data in the social data and the physical data to internal data types;

extracting features from unstructured social data;

identifying attributes related to the features;

obtaining values for the identified attributes;

interpreting movement of the user by examining the physical data; and detecting a situation of the user by fusing the movement of the user with the identified attributes of the features of the unstructured social data and features of structured social data, wherein the features of the unstructured social data and the features of the structured social data comprise at least one of: one or more named entities and one or more topics.

22. The method of claim 1, wherein the situation is used for providing one or more of advertising, automatic social updates and recommendations.

23. The method of claim 1, wherein the identified attributes comprise one or more of user emotional state and participation in an event.

24. The method of claim 1, wherein the unstructured social data comprises text information from one or more of user contacts, calendar information, email information and text message information.

* * * * *